Nov. 15, 1927. 1,649,166
A. A. KAHIL
CUSHION BUMPER
Filed Feb. 5, 1927
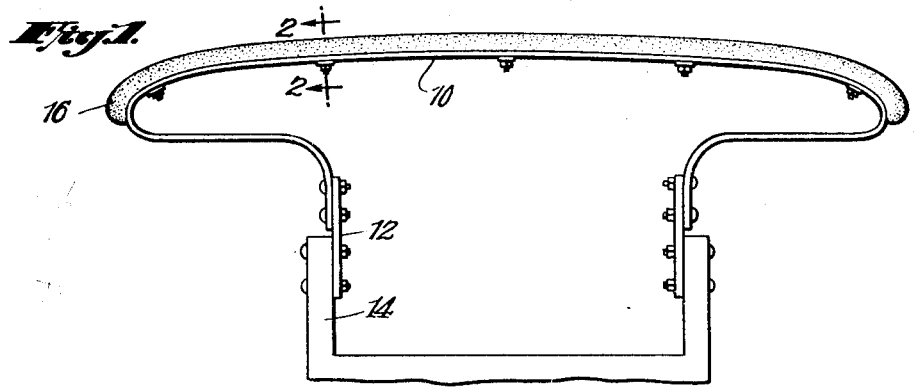
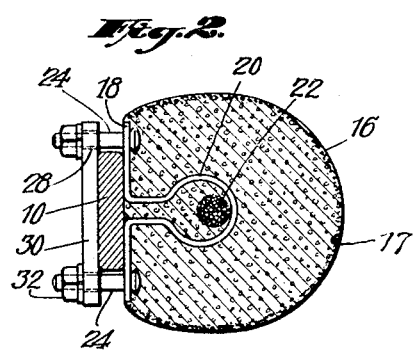
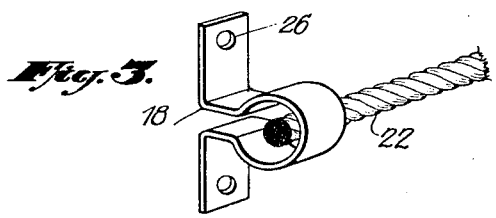
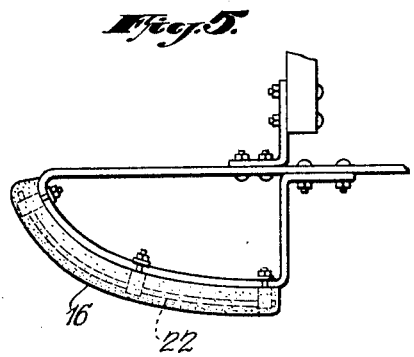
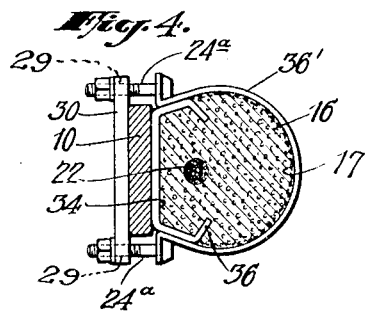
INVENTOR
ABRAHAM A. KAHIL.
BY
ATTORNEY Patented Nov. 15, 1927.

1,649,166

UNITED STATES PATENT OFFICE.

ABRAHAM A. KAHIL, OF BROOKLYN, NEW YORK.

CUSHION BUMPER.

Application filed February 5, 1927. Serial No. 166,091.

This invention relates to bumpers such as used on motor vehicles and aims to provide additional cushion means which will lessen the shock when the bumper strikes another object. It also provides means for preventing scratching or otherwise mutilating an object which it strikes.

The invention will be understood from the following specification when read in connection with the accompanying drawings and the features of novelty will be pointed out with particularity in the appended claims.

In the drawings—

Fig. 1 is a plan view showing a conventional bumper having applied thereto a cushion member embodying my invention;

Fig. 2 is a sectional view on line 2—2 of Fig. 1;

Fig. 3 is a perspective view of an attaching clip adapted to be partially embedded in the cushion member;

Fig. 4 is a cross-sectional view illustrating a modification;

Fig. 5 illustrates the application of my improved cushioning member to the bumperette such as frequently used on the rear of automobiles.

Referring in detail to the drawings, 10 represents a conventional form of bumper which is secured by means of clips 12 to the side channels 14, 14 of an automobile chassis. To the outer surface of the bumper I detachably secure a cushioning member indicated as a whole at 16. This member is preferably formed of solid sponge rubber. This material possesses the inherent characteristics which peculiarly well suit it for use as a bumper cushion. Solid sponge rubber can readily be compressed to about one-half of its normal thickness and thereby serves as a very effective shock absorber. The cushion member 16 is provided with a number of attaching clips 18 each having an enlarged eye portion 20 embedded in the solid rubber cushion. The enlarged eye serves to secure a good hold on the cushion. In addition to the enlarged eye, I provide auxiliary anchoring means such as indicated at 22. This anchoring means may be in the form of a length of flexible rope as indicated in Fig. 3. In some instances, however, the member 22 may be in the form of a metallic wire extending longitudinally throughout the entire length of the bumper terminating just short of the ends. Such a metallic member will serve as a reinforcement to prevent the rubber from hanging down limp before assembling. This member 22 may also be made in short lengths if desired.

The cushion is secured to the bumper 10 by means of bolts 24 which pass through suitable openings 26 of the attaching clips 18 and also through holes 28 in strap members 30, the parts being held in assembled relationship by means of the clamp nuts 32 threaded on the ends of said bolts 24.

In the modification shown in Fig. 4, a cushion member 16 is provided with a foundation plate 34 having inwardly extending anchoring prongs 36. Instead of securing the cushion to the bumper 10 by means of embedded clips as in Fig. 2, I provide flexible strips 36' which embrace the cushion. These strips in connection with bolts 24$^a$ and the members 30 serve to clamp the cushion securely to the bumper 10.

Fig. 5 illustrates the application of my improved solid cushion member to the curved end of a conventional form of rear bumperette. In this embodiment of the invention, the member 22 is preferably made of relatively stiff material so that the shape of the cushion can be formed to fit the curvature of such a curved bumper.

The outer surface of the cushion member is preferably made of smooth rubber of more dense composition than the interior spongy rubber body. This outer stratum which is indicated at 17 by the heavier stippling serves to weatherproof the cushion. This dense stratum 17 also makes the cushion airtight and waterproof.

The sponge rubber body of the cushion contains innumerable cells which are filled with air. That is to say, the solid body contains a multiplicity of miniature air globules which are isolated from one another by solid walls of rubber. This characteristic of the material makes it particularly useful as a bumper cushion because the great number of air globules collectively form an effective air cushion.

While I have described the specific details of the embodiments of the invention herein illustrated, it is not to be construed that I am limited thereto since various modifications may be made by those skilled in the art without departing from the invention as defined in the appended claims.

What I claim is:—

1. A bumper having a solid sponge rubber member detachably secured thereto.

2. In combination with a bumper, a nonmetallic outer member, an attaching clip having an eye embedded therein and anchoring means passing through said eye and embedded in said member.

3. In combination with a bumper, a sponge rubber member on the outer face thereof, attaching clips having eye portions embedded in said rubber member and an embedded member extending through said eye portions.

4. An article of manufacture comprising a sponge rubber strip having attaching clips embedded therein adapted to be secured to a bumper.

5. An article of manufacture comprising a sponge rubber strip having attaching clips embedded therein adapted to be secured to a bumper and an inner embedded member interlocked with said clips.

6. A bumper having a solid sponge rubber cushion secured thereto, the outer surface of said cushion being more dense than the inner portion thereof.

In witness whereof, I have hereunto signed my name.

ABRAHAM A. KAHIL.